United States Patent Office 3,555,105
Patented Jan. 12, 1971

3,555,105
DEHYDROGENATION
George J. Nolan, Robert J. Hogan, Emory W. Pitzer, and Elliott P. Doane, Bartlesville, Okla., assignors to Phillips Petroleum Company, a corporation of Delaware
No Drawing. Filed Feb. 19, 1968, Ser. No. 706,646
Int. Cl. B01j 11/82; C07c 5/18
U.S. Cl. 260—680                                   7 Claims

ABSTRACT OF THE DISCLOSURE

Catalysts formed from a phosphorus-containing compound such as phosphoric acid, a tin compound such as tin chloride, and at least one of a Group I-B, II-B, or VIII metal or a compound containing at least one of said metals are used for oxidative dehydrogenation.

This invention relates to a new and improved dehydrogenation catalyst and a dehydrogenation process using that catalyst.

Heretofore oxidative dehydrogenation catalysts have been formed from phosphoric acid and tin oxide.

It has now been found that improved dehydrogenation catalysts can be formed from phosphoric acid or a phosphate as hereinafter defined, a tin compound, and at least one of metals of Group I-B, II-B, and VIII, and compounds containing I-B, II-B, and/or VIII metals.

Groups I-B, II-B, and VIII as used herein are those shown in the Periodic Table in the Handbook of Chemistry and Physics, published by the Chemical Rubber Company, 45th Edition, 1964, page B-2, and include copper, silver, gold, zinc, cadmium, mercury, iron, ruthenium, osmium, cobalt, rhodium, iridium, nickel, palladium, and platinum.

The improved catalysts of this invention are more active over a longer period of time than similar catalysts not containing the Group I-B, II-B, or VIII metal so that by employing the catalysts of this invention, longer dehydrogenation runs can be employed and the average feed conversion for a given dehydrogenation run will be higher.

The products of the process and catalyst of this invention are unsaturated compounds such as butadiene, isoprene, styrene, and 2-methyl-5-vinylpyridine, which are all useful as monomers for polymerization processes to make useful materials such as rubber for pneumatic tires, polystyrene which can be formed into articles such as tumblers, and the like.

Accordingly, it is an object of this invention to provide a new and improved dehydrogenation catalyst and method.

It is another object of this invention to provide a new and improved catalyst useful in oxidative dehydrogenation processes.

Other aspects, objects and the several advantages of this invention will become apparent to one skilled in the art from a study of this disclosure, and the appended claims.

By this invention, a catalyst is formed from the combination of an ammonium and/or alkali and/or alkaline earth metal phosphate and/or phosphoric acid, at least one tin compound as hereinafter defined, and at least one of Group I-B, II-B, and VIII metals, and compounds containing those metals as hereinafter defined, each component being combined with the other in amounts to form a final composition effective as a catalyst for dehydrogenation processes.

Substantially any phosphorus, tin, and Group I-B, II-B and VIII metal containing compounds can be employed in the catalyst so long as at least one of the compounds used contains oxygen, none of the compounds is deleterious to the dehydrogenation catalytic effects, and all the elements in the compounds used other than phosphorus, tin, oxygen, and Group I-B, II-B, and VIII metals are substantially volatilized by heating the catalyst to at least the temperature at which the catalyst is used, e.g., at least 700° F., and below the decomposition temperature of the catalyst, or are removed by washing the catalyst with a liquid such as water.

Suitable phosphorus-containing compounds include phosphoric acid, phosphorus pentoxide, the phosphorus halides, the ammonium phosphates, and the Group I-A and II-A metal phosphates such as lithium phosphate, monobasic sodium phosphate, dibasic potassium phosphate, rubidium phosphate, monobasic cesium phosphate, magnesium phosphate, dibasic calcium phosphate, and the like. The term "phosphate" is intended to include not only the monophosphate ion, $PO_4^{-3}$, but also polyphosphate ions $(P_nO_{3n+1})^{-(n+2)}$ and $[P_nO_{3n-1}(OH)_2]^{-n}$, in which $n$ is an integer in the range of 2 through 100.

The tin compound or compounds employed include any such compound soluble or dispersable in water, alcohol, or ether and include both stannous or stannic compounds. Representative examples of suitable tin compounds are, for sake of brevity, given only as the stannic compound but it is to be understood that the corresponding stannous compound is equally as applicable. Representative examples include stannic halides (stannic fluoride, stannic chloride, stannic bromide, stannic iodide), stannic sulfate, stannic acetate, stannic oxide, stannic tartrate, and stannic nitrate.

Besides elemental metals of Groups I-B, II-B, and VIII, compounds containing these metals that can also be employed include the nitrates, the halides, the sulfates, the oxalates, the acetates, the carbonates, the propionates, the tartrates, the bromates, the chlorates, the oxides, the hydroxides, and the like.

The phosphorus-containing compound or compounds, the tin-containing compound or compounds, and the Groups I-B, II-B, or VII metal or metal-containing compounds can be combined in any conventional manner which will yield catalytic combinations suitable for conventional dehydrogenation processes. For example, the catalyst components can be combined using a coprecipitation technique as disclosed in detail hereinafter in the specific examples, by conventional aqueous or nonaqueous solution or suspension mixing, by ion exchange, by simply mixing the components by themselves without the use of additional dispersants or solvents, and the like including combinations of these techniques.

Generally, the catalysts can be formed by mixing the components for periods varying from about 1 minute to about 5 hours in the presence or absence of a solvent or dispersant, at temperatures from about ambient, i.e., about 60° F., up to about 200° F. Ambient, sub-ambient, or super-ambient pressures, and ambient or inert atmospheres such as nitrogen, and the like can be used.

Suitable solvents or dispersants that can be employed for the combining of the catalyst components include water, alcohol, or ethers for the step of combining the tin compound and phosphorus compound, and these solvents as well as hydrocarbons, halogenated hydrocarbons, ketones, esters, and the like can be employed for any other steps of the catalyst preparation.

The catalyst itself when finished and in a condition for use in a dehydrogenation process such as an oxidative dehydrogenation process will contain from about 0.5 to about 20 weight percent phosphorus, from about 30 to about 75 weight percent tin, and from about 1 to about 25 weight percent of the Group I-B, II-B or VIII metal or mixture of such metals, all weight percentages being based on the total weight of the final catalyst.

An important advantage from the use of the Group VIII metal or metal-containing compounds is that catalysts using this metal can be prepared having phosphorus contents in excess of 16 weight percent based on the total weight of the final catalyst. If desired, when using the Group VIII metal or metal-containing compound in the catalyst of this invention, the phosphorus content of the final catalyst can be increased above the normal limit of 16 weight percent based upon the total weight of the final catalyst so that by the use of the Group VIII metal and/or metal-containing compound, the catalyst can be made to contain as much as 20 weight percent phosphorus if desired, based on the total weight of the final catalyst.

The total amount of phosphorus, tin, and Group I-B, II-B, or VIII metal present in the final catalyst is less than 100 percent of the catalyst, e.g., from about 15 to about 40 weight percent less based on the total weight of the final catalyst, the difference between the total and the 100 percent being substantially combined oxygen in sufficient amounts to satisfy the valence requirements of the phosphorus, tin, and Group I-B, II-B or VIII metal.

The tin and Group I-B, II-B, or VIII metals present in the final catalyst are believed to be primarily present therein as oxides, phosphates and/or combinations thereof, the total amount of tin plus the Group I-B, II-B, and/or VIII metal present in the final catalyst preferably being in the range of from about 40 to about 76 weight percent.

A presently preferred method of making the catalyst of this invention is to mix solutions or suspensions of, for example, the phosphates and/or phosphoric acid, one or more tin compounds, one or more Group I-B, II-B, and/ or VIII metals or compounds, and at least one of ammonia, ammonium hydroxide, sodium hydroxide and potassium hydroxide, filter, wash to remove any undesirable electrolytes, dry, and calcine. A particle-forming step such as pelletizing or screening can precede or follow the drying step or calcining step.

The concentration of the various solutions that can be used to make the catalyst can vary widely, e.g., from about 0.01 to about 10 molar or more, depending on the solubility of the particular materials employed. It presently appears that any order of mixing can be used, and the final pH of the mixture can generally be in the range of from about 2 to about 7, preferably from about 3.5 to about 6.5. The precipitate that forms is separated from the liquid by any conventional means such as filtration. Thereafter the precipitate is washed with dilute aqueous ammonium salt solutions such as ammonium acetate, ammonium nitrate, ammonium sulfate, and the like, and/or with deionized water to remove electrolytes. The washed precipitate is then dried for from 2 to about 24 hours at temperatures of from about 100 to about 300° F. in air or in inert atmosphere such as nitrogen. The dried precipitate is then calcined from about 1 to about 24 hours at from about 1000 to about 1500° F., preferably at about the temperature at which the catalyst is to be used in the dehydrogenation process, under ambient or inert atmospheres. The drying and calcining steps remove water and other volatile materials from the catalyst, thus preshrinking the catalyst so that it will not shrink further when used in the dehydrogenation process, and also serve to activate the catalyst. As mentioned before, the particle-forming step can precede or follow the drying or calcining step. The dried and calcined catalyst is preferably formed into $\frac{1}{16}$- to $\frac{1}{2}$-inch pellets by compression molding or extrusion, or is simply screened to a desired size, such as 10-28 mesh (Tyler Sieve Series, Mechanical Engineers Handbook by L. S. Marks, 4th edition, McGraw-Hill Book Co., Inc., New York, 1941, page 836). Optimally a particulate tin/phosphorus/oxygen material is formed, and the Group I-B, II-B, and VIII metal containing compound or compounds is added by, for example, impregnation followed by drying.

The catalysts of this invention can be used in any conventional dehydrogenation, particularly oxidative dehydrogenation, process using conventional procedures and techniques. Suitable oxidative dehydrogenation processes are those which dehydrogenate at least one material selected from the group consisting of alkenes, cycloalkenes, alkylpyridines, and alkyl aromatics, using an elevated temperature, and a molecular oxygen-containing gas, with or without the presence of steam. The alkenes can contain from 3 to 10, preferably 4 to 6, carbon atoms per molecule, inclusive, and the cycloalkenes can contain from 4 to 10, preferably 4 to 6, carbon atoms per molecule, inclusive. The alkyl pyridines and alkyl aromatics can contain from 1 to 4, preferably 1 to 2, alkyl groups per molecule which themselves contain from 1 to 6, preferably 4 to 6, carbon atoms per group, inclusive, with at least one alkyl group having at least 2 carbon atoms.

Examples of suitable materials include propylene, n-butenes, n-pentenes, isopentenes, octenes, decenes, and the like. Also included are alkyl-substituted and unsubstituted cycloalkenes such as cyclobutene, cyclopentene, cyclohexene, 3-isopentylcyclopentene, and the like. Other materials include ethylbenzene, propylbenzene, n-butylbenzene, isobutylbenzene, hexylbenzene, 1-methyl-2-propylbenzene, 1-butyl-3-hexylbenzene, and the like. Still other materials include ethylpyridine, 2-methyl-5-ethylpyridine, 2,3,4-trimethyl-5-ethylpyridine, 2-ethyl-5-hexylpyridine, and the like.

Preferred reactions applicable to this invention are the formation of 1,3-butadiene from butenes, 1,3-pentadiene from pentenes, isoprene from methylbutenes, styrene from ethylbenzene, and 2-methyl-5-vinylpyridine from 2-methyl-5-ethylpyridine.

The catalyst of this invention can be used in the form of granules, mechanically formed pellets, or any other conventional form for a catalyst. The catalysts can also be employed with suitable supporting or diluting materials such as alumina (preferably eta or gamma or mixtures thereof), boria, beryllia, magnesia, titania, zirconia, silica, or mixtures such as alumina-boria, silica-alumina, and the like and similar conventional materials known in the art. They can be used in fixed or fluid bed operations.

The amount of catalyst employed will vary widely depending on the materials present and the conversion and selectivity desired, but generally the amount will be that which, for the given reaction, is an effective catalytic amount to produce the desired dehydrogenation results.

The molecular oxygen-containing gas employed in oxidative dehydrogenation can be present as such or with inert diluents such at nitrogen and the like. Suitable molecular oxygen-containing gases include air, flue gases containing residual oxygen, and any other conventional gas of a similar nature. Pure or substantially pure oxygen can also be employed if desired.

The operating conditions for the process of this invention can vary widely but will generally include a temperature from about 700 to about 1300° F., preferably from about 800 to about 1200° F.; a pressure from about 0.05 to about 250, preferably from about 0.1 to about 25, p.s.i.a.; if used, an oxygen to gaseous organic compound feed volume ratio of from about 0.1/1 to about 3/1, preferably from about 0.5/1 to about 2/1; and if steam is used, a steam to organic compound feed volume ratio of 0.1/1 to 50/1, preferably 5/1 to 20/1. The organic compound feed space rate (volumes organic compound vapor/ volume of catalyst/hour, 32° F., 15 p.s.i.a.) can be from about 50 to about 5000, preferably from about 100 to about 2500.

The process of this invention is ordinarily carried out by forming a mixture, preferably preheated, of organic compound feed; steam, if used; and oxygen and/or oxygen-containing gases, and passing this mixture over the catalyst at the desired temperature. Recycle of unconverted organic compound feed can be employed if desired; however, the conversion rates and selectivity of this invention are generally sufficiently high to justify a single pass operation, if, for example, the product streams can be used without separation steps in a subsequent operation, such as polymerization.

The catalysts of the invention operate for long periods of time, but when regeneration is necessary it can be effected simply by discontinuing organic compound flow for a short period of time.

In the following examples, the catalyst tests were made using 20–28 mesh (Tyler Sieve Series) catalyst granules.

EXAMPLE I

Catalyst preparation

Catalyst 1.—Tin chloride in the form $SnCl_4 \cdot 5H_2O$ and in the amount of 46.5 pounds was dissolved in 13 liters of deionized water. Eight gallons of aqueous ammonia (28 weight percent ammonia) was diluted with eight gallons of deionized water. The solution of tin chloride and the solution of ammonia were added to 13 gallons of deionized water over a 27 minute period, the addition rate of the ammonia solution being controlled so as to maintain the resulting mixture at a pH of 5. About 15 gallons of the ammonia solution was used in making the final mixture. After one hour of stirring the suspension at about 90° F., the suspenison was filtered and the precipitate washed four times with a solution formed by dissolving 6.5 pounds of ammonium nitrate in 20 gallons of deionized water. The precipitate was then washed twice with a solution formed by dissolving 1.5 pounds of ammonium nitrate in 20 gallons of deionized water. After the filtration, it was determined that the wet gel remaining contained 38 weight percent tin oxide in the form of $SnO_2$. To a 4470 gram portion of this wet gel, 316 grams of 85 weight percent phosphoric acid was added with rapid stirring at 90–100° F. over a 30 minute period. The resulting material was then air dried for two days at 80° F. and calcined one hour at 1100° F. in an air atmosphere. In reaching the calcining temperature of 1100° F., the temperature was gradually increased to 1100° F. at the rate of 5° F. per minute. The calcined material was then ground to about 6 mesh (Tyler Sieve Series). The final phopshorus content of the calcined material was 5 weight percent and the final tin content was 69 weight percent, both weight percentages being based on the total weight of the final calcined material.

Catalyst 2.—Sufficient silver sulfate to give about 0.5 weight percent silver in the final catalyst was dissolved in sufficient deionized water to just wet a 15 gram portion of Catalyst 1 and the aqueous silver sulfate liquid was then added to the 15 gram portion of Catalyst 1. The resulting mixture was mixed for 5–10 minutes at 90–100° F., dried 12 hours in air at 320° F. and then calcined 2 hours in air at 1100° F.

Catalyst 3.—This catalyst was made in the same manner as catalyst 2 except that zinc nitrate was employed instead of silver sulfate.

Catalyst 4.—This catalyst was made in the same manner as Catalyst 2 except that mercuric nitrate was employed instead of silver sulfate, and the mercury content of the final catalyst was about 0.5 weight percent.

The above four catalysts were tested in a dehydrogenation process wherein butene-2 was dehydrogenated to butadiene at feed, air, and steam space velocities of 200, 1000 and 2400, respectively, volumes per volume of catalyst per hour at 32° F. and 15 p.s.i.a. The dehydrogenation process was carried out at atmospheric pressure and a furnace temperature of 1000° F. Butene-2 conversion and butadiene selectivity both in mols per 100 mols of butene-2 in the feed, were determined for each catalyst at the start of each dehydrogenation run and again after three hours on stream. After three hours on stream, all four catalysts were operating at a butadiene selectivity of about 79 mol percent. The butene-2 conversion and butadiene selectivity values were determined by gas-phase chromatography.

From the initial and three hour butene-2 conversion measurements, the decrease in conversion was calculated. The results were as follows:

TABLE I

| Catalyst number: | Decrease in butene conversion, percentage points |
|---|---|
| 1 | 26 |
| 2 | 10 |
| 3 | 19 |
| 4 | 19 |

From Table I, it is clear that the catalyst which contained the silver, zinc or mercury showed a lesser decrease in butene conversion after three hours on stream which shows that the catalysts using these metals were more active for a longer period of time.

EXAMPLE II

Catalyst preparation

Catalyst 5.—This catalyst was prepared in the same manner as Catalyst 1 of Example I.

Catalyst 6.—Sufficient nickel nitrate to give 0.5 weight percent nickel in the final catalyst was dissolved in sufficient deionized water to just wet a 15 gram portion of catalyst 5, and the aqueous nickel nitrate liquid was then added to a 15 gram portion of Catalyst 5. The resulting mixture was dried 12 hours in air at 320° F., and calcined 2 hours in air at 1100° F.

Catalyst 7.—This catalyst was prepared in the same manner as Catalyst 6 except that platinous chloride was employed instead of nickel nitrate.

Catalyst 8.—Tin chloride in the form of $SnCl_4 \cdot 5H_2O$ and in the amount of 904 grams was dissolved in 1600 milliliters of deionized water and filtered. An aqueous phosphoric acid solution containing 85 weight percent phosphoric acid and in the amount of 550 grams was neutralized with aqueous ammonia (28 weight percent ammonia) to get a resulting solution having a pH of 6.8. These solutions of tin chloride and phosphoric acid were added substantially simultaneously to 1000 milliliters of deionized water. The deionized water was initially heated to 180° F. and thereafter maintained at temperatures in the range of 120 to 140° F. during the period when the tin chloride and phosphoric acid solutions were added to the water. The pH of the final mixture of 0.9. The precipitate in this final mixture was washed five times by diluting to 3500 milliliters with deionized water and filtering to apparent dryness. A portion of the remaining filtrate was dried 24 hours in air at 150° F. and calcined 2 hours in air at 1100° F. The final tin and phosphorus content in the calcined filtrate was 43 and 17.7 weight percent, respectively, based on the total weight of the calcined material.

Catalyst 9.—A portion of the undried material of Catalyst 8 equivalent to 40 grams of dry material was mixed with 100 milliliters of 6-normal ferric nitrate dissolved in water and allowed to stand 24 hours in an air atmosphere at 80° F. Excess ferric nitrate not held by ion exchange was removed by washing the resulting gel with copious amounts of deionized water. The resulting material was dried 24 hours in air at 150° F. and calcined 2 hours in air at 1100° F. The resulting material had an iron content of 6.1 weight percent based upon the total weight of the calcined material.

The above five catalysts were tested in a dehydrogenation process which was the same as that described in Example I except that for Catalysts 8 and 9 the steam space velocities were 3000 instead of 2400. For Catalysts 5–7 the butene conversion and butadiene selectivity rates were measured initially, and after three hours on stream. After three hours on stream, all three catalysts were operating at a butadiene selectivity of about 79 mol percent. From these measurements the decrease in butene conversion rate was calculated for Catalysts 5–7. For Catalysts 8 and 9 butene-2 conversion (conv.) and butadiene selectivity (selec.) both in mols per 100 mols of butene-2 in the feed, were determined after 15 minutes and 180 minutes on stream.

The butene-2 conversion and butadiene selectivity values were determined by gas-phase chromatography.

The results for Catalysts 5–7 were as follows:

TABLE II

| Catalyst number: | Decrease in butene conversion, percentage points |
|---|---|
| 5 | 26 |
| 6 | 20 |
| 7 | 16 |

Thus, it is clear that Catalysts 6 and 7 which contain nickel and platinum, respectively, showed a lesser decrease in butene conversion after three hours on stream which shows that Catalysts 6 and 7 were more active for a longer period of time.

The results for Catalysts 8 and 9 were as follows:

TABLE III

|  | 15 minutes | | 180 minutes | |
|---|---|---|---|---|
|  | Conversion | Selectivity | Conversion | Selectivity |
| Catalyst: | | | | |
| 8 | 8.5 | 98 | 5.5 | 98 |
| 9 | 87 | 81 | 85 | 83 |

From Table III it can be seen that Catalyst 9 which contained iron was considerably more active catalytically speaking and actually increased in selectivity after 180 minutes on stream, whereas Catalyst 8 showed no change in selectivity.

EXAMPLE III

Catalyst preparation

Catalyst 10.—Two liters of an aqueous solution containing 194 grams of cobalt nitrate in the form

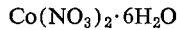

$Co(NO_3)_2 \cdot 6H_2O$ and 117 grams of tin chloride in the form $SnCl_4 \cdot 5H_2O$ were added to a liter of ammonium hydroxide solution containing 178 milliliters of concentrated ammonium hydroxide (29 weight percent $NH_3$) and 150 grams of ammonium nitrate. The pH of the solution was decreased to 6 by the addition of nitric acid. A precipitate formed in the resulting liquid mixture and was filtered therefrom, washed once with three liters of 2-molar ammonium nitrate, and finally with three liters of deionized water. The precipitate was then dried overnight at 212° F. in air in a vacuum oven and calcined overnight at 1100° F. in air. Twenty-five grams of the dried precipitate was pulverized to about 28 mesh or smaller (Tyler Sieve Series) and impregnated with a solution containing 2.96 ml. of 85 percent phosphoric acid, diluted to 15–20 ml. with deionized water. The impregnated material was then dried overnight at 212° F. in air in a vacuum oven and thereafter calcined in air for 2 hours at 1100° F.

The calcined material was then ground to 20 to 28 mesh (Tyler Sieve Series) and employed as the catalyst in an oxidative dehydrogenation process wherein butene-2 was dehydrogenated to produce butadiene. In the dehydrogenation process, the air, butene-2 feed, and steam space velocities were 1000, 200, and 3000 respectively, volumes per volume of catalyst per hour 32° F and 15 p.s.i.a. The dehydrogenation process was carried out at atmospheric pressure and a temperature of 1000° F. Butene conversion (conv.) and butadiene selectivity (selec.) both in mols per 100 mols of butene-2 in the feed, were determined after ¼ hour, 1 hour, and 3 hours on stream. The butene-2 conversion and butadiene selectivity values were determined by gas-phase chromatography.

The results for this catalyst were as follows:

TABLE IV

| ¼ hour | |
|---|---|
| Conv. | 42 |
| Selec. | 77 |
| 1 hour | |
| Conv. | 38 |
| Selec. | 76 |
| 3 hours | |
| Conv. | 36 |
| Selec. | 75 |

The above data show that a tin-phosphorus catalyst containing cobalt is very effective in the dehydrogenation process.

Reasonable variations and modifications are possible within the scope of this disclosure without departing from the spirit and scope thereof.

We claim:

1. An oxidative dehydrogenation catalyst consisting of that formed by combining under dehydrogenation catalyst forming conditions (1) at least one phosphorus-containing compound in amounts sufficient to add to the final catalyst from about 0.5 to about 20 weight percent phosphorus based on the total weight of the final catalyst, (2) at least one tin-containing compound in an amount sufficient to add to the final catalyst from about 30 to about 75 weight percent tin based on the total weight of the final catalyst, and (3) at least one of Group I–B, II–B, and VIII metals and compounds containing at least one of those metals, at least one of said (1), (2), and (3) materials contains oxygen, none of said materials being deleterious to dehydrogenation catalytic effects, and substantially all the elements in said materials other than phosphorus, tin, oxygen and the Group I–B, II–B, and VIII metals being volatilized by heating the catalyst at least to the temperature at which the catalyst is used in a dehydrogenation process or removed from the catalyst by washing with a liquid that is non-deleterious to the catalytic effects of the catalyst, said (3) materials being employed in amounts sufficient to add to the catalyst from about 1 to about 25 weight percent of the (3) material, calculated as metal, based on the total weight of the final catalyst.

2. In an oxidative dehydrogenation process which employs a tin-phosphorus catalyst, the improvement comprising employing a dehydrogenation catalytic amount of the catalyst of claim 1.

3. A method according to claim 2 wherein in the formation of said catalyst the phosphorus-containing compound or compounds are selected from ammonium and Group I–A and II–A metal phosphates, phosphorus pentoxide, and phosphoric acid, the tin compound or compounds are tin halide, tin sulfate, tin acetate, tin oxide, tin tartrate, and tin nitrate, and the Group I–B, II–B and VIII compounds are nitrates, halides, sulfates, oxylates, acetates, carbonates, propionates, tartrates, bromates, chlorates, oxides, or hydroxides; and wherein the dehydrogenation process is carried out using a temperature of from about 700° F. to about 1300° F., a pressure of from about 0.05 to about 250 p.s.i.a., an oxygen to gaseous dehydrogenation feed volume ratio of from 0.1/1 to about 3/1, and a dehydrogenation feed space rate in volumes of dehydrogenation feed vapor per volume of catalyst per hour at 32° F., and 15 p.s.i.a. of from about 50 to about 5000.

4. The method according to claim 2 wherein said catalyst is formed from a combination of phosphoric acid, tin halide and a compound selected from the group consisting of Group I–B, II–B, and VIII metals, and nitrates, halides, sulfates, oxylates, acetates, carbonates, propionates, tartrates, bromates, chlorates, oxides, and hydroxides of Group I–B, II–B, and VIII metals, and the catalyst is used to oxidatively dehydrogenate at least one butene to butadiene.

5. The method according to claim 2 wherein the catalyst employed is formed from the combination of phosphoric acid, stannic chloride, and silver sulfate, zinc nitrate, mercury nitrate, nickel nitrate, platinum chloride, iron nitrate, or cobalt nitrate, wherein the combining of these materials is carried out by mixing same for from about 1 minute to about 5 hours at temperatures from about ambient to about 200° F.

6. The method according to claim 2 wherein the catalyst employed is formed by mixing phosphoric acid, stannic chloride and mercuric nitrate, platinous chloride, ferric nitrate or cobaltous nitrate for from about 1 minute to about 5 hours at tempeartures from about ambient to about 200° F.

7. The method according to claim 2 wherein steam is employed in a volume ratio of steam to organic compound feed of from about 0.1/1 to about 50/1.

References Cited

UNITED STATES PATENTS

| | | | |
|---|---|---|---|
| 3,274,283 | 9/1966 | Bethell | 260—680 |
| 3,320,329 | 5/1967 | Nolan | 260—F80 |
| 3,409,697 | 11/1968 | Callahan et al. | 260—680 |
| 3,437,703 | 4/1969 | Reitmeier et al. | 260—680X |

PAUL M. COUGHLAN, JR., Primary Examiner

U.C. Cl. X.R.

252—437; 260—669, 696